(12) United States Patent
Dorsch et al.

(10) Patent No.: US 10,467,604 B1
(45) Date of Patent: Nov. 5, 2019

(54) ATM TRANSACTION WITH A MOBILE DEVICE

(75) Inventors: William Michael Dorsch, De Pere, WI (US); Nathaniel David Anderson, Palo Alto, CA (US); Joseph Hikmet Guzel, Palo Alto, CA (US); Jonathan David Fasoli, Aliso Viejo, CA (US)

(73) Assignee: Intuit Inc., Mountain View, CA (US)

( * ) Notice: Subject to any disclaimer, the term of this patent is extended or adjusted under 35 U.S.C. 154(b) by 1911 days.

(21) Appl. No.: 13/458,938

(22) Filed: Apr. 27, 2012

(51) Int. Cl.
| | |
|---|---|
| *G06Q 20/10* | (2012.01) |
| *G06Q 40/02* | (2012.01) |
| *G06Q 20/32* | (2012.01) |
| *G07F 19/00* | (2006.01) |

(52) U.S. Cl.
CPC ....... *G06Q 20/1085* (2013.01); *G06Q 20/322* (2013.01); *G06Q 40/02* (2013.01); *G07F 19/20* (2013.01)

(58) Field of Classification Search
CPC .. G06Q 20/1085; G06Q 20/322; G06Q 40/02; G07F 19/20
USPC .................................................. 705/50–500
See application file for complete search history.

(56) References Cited

U.S. PATENT DOCUMENTS

| | | | | |
|---|---|---|---|---|
| 5,897,625 A | * | 4/1999 | Gustin .................. | G06Q 20/04 109/24.1 |
| 2011/0191252 A1 | * | 8/2011 | Dai ....................... | G06Q 20/10 705/71 |
| 2011/0246316 A1 | * | 10/2011 | Cincera ............. | G06Q 20/1085 705/17 |
| 2012/0197798 A1 | * | 8/2012 | Grigg ................. | G06Q 20/1085 705/43 |
| 2012/0292388 A1 | * | 11/2012 | Hernandez ........... | G06Q 20/108 235/379 |
| 2013/0041821 A1 | * | 2/2013 | Kingston ............... | G06Q 40/02 705/44 |
| 2014/0120986 A1 | * | 5/2014 | Lawson ................ | G06K 7/083 455/558 |
| 2014/0162598 A1 | * | 6/2014 | Villa-Real ............. | H04M 1/66 455/411 |

* cited by examiner

*Primary Examiner* — Calvin L Hewitt, II
*Assistant Examiner* — Sima Asgari
(74) *Attorney, Agent, or Firm* — Ferguson Braswell Fraser Kubasta PC

(57) ABSTRACT

A method for conducting financial transactions with an automated teller machine (ATM), including: receiving, by a mobile device, a first authentication credential from a user; authenticating, by the mobile device, the user for access to a financial account based on the first authentication credential; wirelessly transmitting, by the mobile device and to the ATM, a first request to establish a direct short range wireless connection with the ATM after authenticating the user; establishing, by the mobile device, the direct short range wireless connection with the ATM after transmitting the first request; and sending, over the direct short range wireless connection, an identifier of the user to the ATM, where the user makes a selection of a cash amount for withdrawal from the financial account, and where the ATM dispenses the cash amount to the user.

11 Claims, 10 Drawing Sheets

ATM TRANSACTION WITH A MOBILE DEVICE

BACKGROUND

Automated teller machines (ATMs) have become an indispensable tool in banking. These machines provide the convenience of performing secure banking transactions without the need for a human operator. An ATM has a relatively small physical footprint and, as a result, may be placed in a variety of locations where in-person banking locations are not feasible or present. Additionally, ATMs may be programmed to function at any time of the day or night. Thus, customers may be able to perform withdrawals, deposits, and balance inquiries when their bank branch location is closed (e.g., during non-business hours).

ATMs are dependent upon financial cards for security and authentication. A financial card may include a number and a magnetic stripe encoding a unique identifier of the card. Traditional ATMs require the user to swipe or enter the financial card and a personal identification number (PIN) in order to perform a transaction. As financial cards have become ubiquitous among individual and business users, the prevalence of financial crimes has also increased. This is complicated by the fact that financial cards are sometimes used for other purposes (not linked to a financial transaction) such as identity verification.

In fact, financial cards are now commonly used to perpetrate identity theft. Identity theft accounts for billions of dollars in losses to businesses and individuals annually and is a leading form of financial crime in the United States. Using only a card number of a financial card (e.g., a debit card), it may be possible for a thief to withdraw money from an account or even to open one or more new credit lines in the name of the card owner. The increase in the usage and scope of financial cards, coupled with the sheer number of cards owned by the average user has contributed to a growing complexity for the user and an increased vulnerability to financial crime.

SUMMARY

In general, in one aspect, the invention relates to a method for conducting financial transactions with an automated teller machine (ATM). The method includes: receiving, by a mobile device, a first authentication credential from a user; authenticating, by the mobile device, the user for access to a financial account based on the first authentication credential; wirelessly transmitting, by the mobile device and to the ATM, a first request to establish a direct short range wireless connection with the ATM after authenticating the user; establishing, by the mobile device, the direct short range wireless connection with the ATM after transmitting the first request; and sending, over the direct short range wireless connection, an identifier of the user to the ATM, where the user makes a selection of a cash amount for withdrawal from the financial account, and where the ATM dispenses the cash amount to the user.

In general, in one aspect, the invention relates to an automated teller machine (ATM). The ATM includes: a computer processor; a short range wireless module configured to: establish a direct short range wireless connection with a mobile device and receive, from the mobile device and over the direct short range wireless connection, an encrypted message including an identifier of a user of the mobile device; and a local transaction engine executing on the computer processor and configured to: prompt the user for an authentication credential after receiving the encrypted message, obtain the authentication credential from the user, authenticate the user for access to a financial account based on the authentication credential, receive, after authenticating the user, a request from the user to withdraw a cash amount from the financial account, and dispense the cash amount to the user in response to the request.

In general, in one aspect, the invention relates to a non-transitory computer-readable storage medium storing instructions for conducting transactions with an automated teller machine (ATM). The instructions include functionality to: receive an authentication credential from a user of a mobile device; authenticate the user for access to a financial account based on the authentication credential; wirelessly transmit, to the ATM, a first request to establish a direct short range wireless connection between the mobile device and the ATM after authenticating the user; establish the direct short range wireless connection after transmitting the first request; and send, over the direct short range wireless connection, an identifier of the user to the ATM, where the user makes a selection of a cash amount for withdrawal from the financial account, and where the ATM dispenses the cash amount to the user.

Other aspects of the invention will be apparent from the following description and the appended claims.

DETAILED DESCRIPTION

Figure 1A:
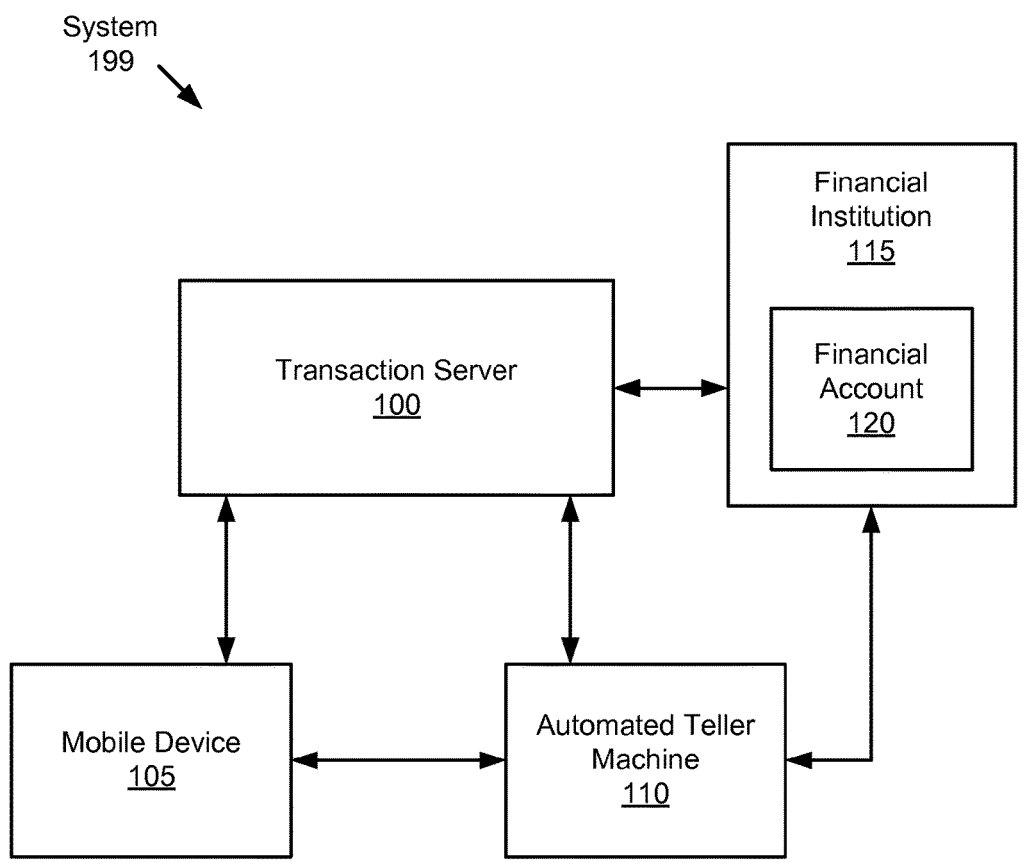
FIGS. 1A and 1B show schematic diagrams of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for conducting transactions with an automated teller machine (ATM). Initially, a user is authenticated for access to a financial account. A direct short range wireless connection is established between a mobile device of a user and the ATM. An identifier of the user is sent to the ATM over the direct short range wireless connection and a selection of a cash amount for withdrawal is received from the user. The ATM then dispenses the cash amount to the user.

FIG. 1A shows a system (199) in accordance with one or more embodiments of the invention. As shown in FIG. 1A, the system has multiple components including a transaction server (100), a mobile device (105), an automated teller machine (ATM) (110), a financial institution (115), and a financial account (120). Various components of the system (199) may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, the transaction server (100) is a software application or a set of software applications executing on one or more hardware processors. The software application may be a web application in a server of a data center and/or a cloud computing application in a network distributed system. Alternatively, the transaction server (100) may be a software application residing in a personal computing device (e.g., smartphone, laptop computer, desktop computer, etc.) of a user. In one or more embodiments of the invention, the transaction server (100) is integrated within or operatively connected to a mobile financial management application (FMA) or a mobile banking application.

In one or more embodiments of the invention, the transaction server (100) includes functionality to link a financial account (120) of the user to an application account of the user. For example, the application account may be a user account storing details of the financial account in a financial management application (FMA). In one or more embodiments of the invention, the FMA includes a mobile application component executing on the mobile device (105). In various embodiments of the invention, the FMA may include or be communicatively connected to other client applications executing on any number of computing devices of the user. The transaction server (100) may receive a request to link the financial account from any computing device used by the user at any location, in accordance with various embodiments of the invention. Thus, the transaction server (100) may link the financial account to the application account during an initial session and may authenticate the user for an ATM transaction during one or more subsequent sessions.

Examples of a financial account may include, but are not limited to, a personal checking account, a personal savings account, a business checking account, a business credit account, a revolving credit account, and/or any other account having a monetary amount available to the user.

In one or more embodiments of the invention, the mobile device (105) includes functionality to capture financial information from a financial card of the user. The financial information may be captured from the financial card using a variety of hardware and software capture technologies, in accordance with various embodiments of the invention.

In one or more embodiments of the invention, the mobile device (105) includes functionality to capture financial information from a financial card of the user by a camera of the mobile device (105). The camera may be configured to capture one or more images of the front and/or back of the financial card. The mobile device (105) may include a mobile software application configured to perform optical character recognition (OCR) on the image(s) and to identify a card number, expiration date, name, phone number, security code, and/or any other financial information displayed on the card.

In one or more embodiments of the invention, the mobile device (105) includes functionality to capture financial information from a financial card of the user by a hardware contactless card reader (not shown) operatively connected to the mobile device (105) or other computing device of the user. The contactless card reader may be configured to capture financial information from the financial card over a wireless signal transmitted by the financial card. Examples of a wireless signal may include, but are not limited to, infrared, radio frequency identification (passive, active, or battery assisted), Near Field Communication (NFC), and any other wireless signal or protocol.

In one or more embodiments of the invention, the mobile device (105) includes functionality to read a financial card of the user by an attached card reader (not shown) operatively connected to the mobile device (105) or other computing device of the user. The attached card reader may be a hardware device connected to the computing device and configured to read magnetic or other financial cards in response to a user swipe of the financial card (or other input). The card reader may transmit information embedded in the financial card (e.g., a user identifier, account information, an encryption key, etc.) to the transaction server (100).

In one or more embodiments of the invention, the transaction server (100) includes functionality to link the financial account corresponding to the card to an application account of the user upon obtaining the information read from the card. The transaction server (100) may also be configured to authorize the user for access to the financial account in response to receiving the information read from the financial card. Establishment of the financial account and/or authorization of the user may occur prior to initiating an ATM transaction involving the financial account and may occur at an entirely different location from where the financial card is used.

In one or more embodiments of the invention, the transaction server (100) includes functionality to receive one or more authentication credentials from a computing device (e.g., mobile device (105)) of the user. The authentication credential(s) may provide access to the application account of the user (discussed above). In one or more embodiments of the invention, the one or more authentication credentials are transmitted to the transaction server (100) over a secure connection established over a wired or wireless network. Examples of an authentication credential may include, but are not limited to, a password, a personal identification number, an answer to a challenge question (e.g., a predefined question selected by the user, a request for financial or personal information of the user, etc.), a selection of a predefined security image, a social security number, and/or any information usable in verifying the identity of the user. In one example, the user may enter a username and password into a mobile banking application or mobile FMA on the mobile device (105). In this example, the mobile banking application sends the credentials to the transaction server (100) for authentication.

In one or more embodiments of the invention, the transaction server (100) includes functionality to authenticate the user for access to one or more financial accounts based on the authentication credential. The transaction server (100) may compare the given authentication credential(s) to the user's account credentials stored in a data repository and determine if a match is made. In one example, upon matching the credentials, the transaction server (100) sends an authentication message to the computing device of the user, along with a set of account information of the user (e.g., account balance(s), transactions, etc.). In one or more embodiments of the invention, the authentication credentials authorize the user for access to an application account linked to one or more financial accounts of the user. In one or more embodiments of the invention, by virtue of authenticating the user for access to the application account, the transaction server (100) may deem that the user is authorized to access all linked financial accounts.

Figure 1B:
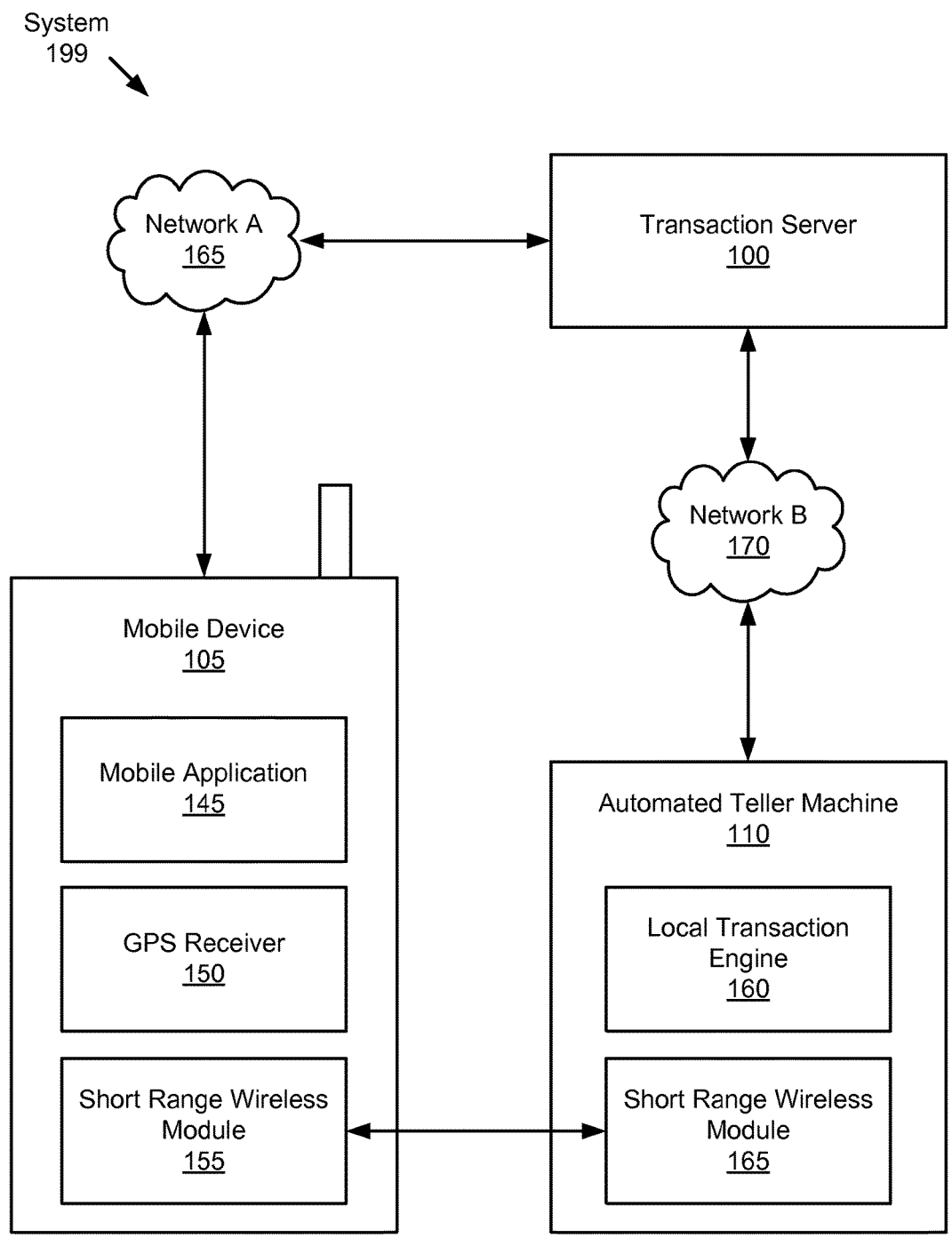

FIG. 1B shows multiple other components of the system (199) in accordance with one or more embodiments of the invention. As shown in FIG. 1B, the system includes the mobile device (105), a mobile application (145), a global positioning system (GPS) receiver (150), a short range wireless module (155), the transaction server (100), the automated teller machine (ATM) (110), a local transaction engine (160), another short range wireless module (165), and multiple networks (i.e., network A (165) and network B (170)). As with FIG. 1A, various components of the system (199) may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, the mobile application (145) is a mobile software application or a series of related applications executing on the mobile device (105). In one or more embodiments of the invention, the mobile application (145) a client component of a larger software system include the transaction server (100) and/or the local transaction engine (160). For example, the mobile application (145) may be a mobile banking application, a mobile financial management application (FMA), a mobile personal finance application, a mobile accounting application, and/or any other relevant software component or application executing on the mobile device (105). In another example, the mobile application (145) is a web browser configured to provide access to a web-based financial management application (e.g., transaction server (100).

In one or more embodiments of the invention, the mobile application (145) includes functionality to facilitate a financial transaction between the user and the ATM (110). The mobile application (145) may initiate the transaction, obtain input from the user, obtain user account and financial information from the transaction server (100), transmit authentication and user requests to the ATM (110), and/or perform other functions related to a cardless financial transaction with the ATM (110), in accordance with various embodiments of the invention. A cardless transaction may be any transaction not requiring the ATM (110) to read a financial card of the user.

In one or more embodiments of the invention, the mobile device (105) includes functionality to wirelessly transmit, to the ATM (110), a request to establish a direct short range wireless connection with the ATM (110). The mobile application (145) may be configured to send the request directly from the short range wireless module (155) of the mobile device (105) to the short range wireless module (165) of the ATM (110) or to send the request to the transaction server (100) over a wireless network (e.g., a cellular data network), in accordance with various embodiments of the invention. In one or more embodiments of the invention, upon receiving the request, the transaction server (100) confirms that the user of the mobile application (145) is authorized to access the financial account (120) and/or that the mobile device (105) is within a predefined radius of the ATM (110).

In one or more embodiments of the invention, the local transaction engine (160) is a software application or a series of related applications executing on the ATM (110). In one or more embodiments of the invention, the local transaction engine (160) a client component of a larger software system including the transaction server (100) and/or the mobile application (145).

In one or more embodiments of the invention, the local transaction engine (160) includes functionality to receive the request and to establish the direct short range wireless connection with the mobile device (105) using the short range wireless module (165) of the ATM (110). The short range wireless modules (155 and 165) are hardware components configured to send and receive a wireless signal between devices. The short range wireless modules may be used by the mobile application (145) and the local transaction engine (160) to establish the direct short range wireless connection, in accordance with various embodiments of the invention.

The direct short range wireless connection may be any wireless personal area network (WPAN) or related technology using a short range wireless protocol. Examples of a short range wireless protocol may include, but are not limited to, IrDA, Bluetooth, Wireless USB, Z-Wave, Zig-Bee, Body Area Network, a wireless personal area network (WPAN), and/or any type of wireless protocol for connecting two or more computing devices.

In one or more embodiments of the invention, the short range wireless protocol requires encryption of some or all data transmitted over the direct short range wireless connection. Thus, in one or more embodiments of the invention, the mobile device (105) and the ATM (110) are configured to encrypt and decrypt data sent over the direct short range wireless connection. Any encryption method may be used, in accordance with various embodiments of the invention. Examples of an encryption method may include, but are not limited to Wired Equivalent Privacy (WEP), Wi-Fi Protected Access (WPA), Advanced Encryption Standard (AES), RSA, and/or any other method of encrypting or securing data for transmission between two or more devices In one or more embodiments of the invention, the mobile application (145) includes functionality to send an identifier of the user to the local transaction engine (160) over the direct short range wireless connection. The identifier of the user may be a unique alphanumeric identifier, a social security number, a name, a financial account number, and/or any combination of data uniquely identifying the user. Any method of identifying the user may be used, in accordance with various embodiments of the invention. The mobile application (145) may be configured to send any other information required for authentication and/or identification of the user, in accordance with various embodiments of the invention. Other examples of an identifier sent by the mobile application (145) to the ATM (110) may include, but are not limited to, a telephone number of the mobile device (105), a Media Access Control (MAC) address, an International Mobile Equipment Identity (IMEI) number, a bank account number, a routing number, personal identification number (PIN), a home address of the user, and/or any other information associated with the user, financial account (120), and/or mobile device (105).

In one or more embodiments of the invention, the local transaction engine (160) includes functionality to determine that the mobile device (105) is within a predefined proximity or range of the ATM (110). In one or more embodiments of the invention, the mobile application (145) is configured to send a location coordinate (e.g., a global positioning system (GPS) coordinate) to the transaction server (100). The transaction server (100) may send a message to the ATM (110) verifying that the mobile device (105) is within the predefined proximity of the ATM (110).

In one or more embodiments of the invention, the mobile application (145) includes functionality to prompt the user to confirm that they are standing in front of the ATM (110) and/or ready to perform an ATM transaction. The mobile application (145) may obtain a confirmation from the user in response to the prompt, and may then initiate the direct short range wireless connection between the mobile device (105) and the ATM (110).

In one or more embodiments of the invention, the global positioning system (GPS) receiver (150) includes functionality to identify one or more GPS coordinates of the mobile device (105). The GPS receiver (150) may be configured to transmit the GPS coordinate(s) to the transaction server and/or the ATM (110) (e.g., over the direct short range wireless connection) in order to confirm or determine that the mobile device (105) is within a predefined range of the ATM (110). In one example, the GPS receiver (150) obtains GPS coordinates of the mobile device (105). In this example, the mobile device (105) sends the GPS coordinates to the transaction server (100) which then compares a location depicted by the GPS coordinates to the predefined location of the ATM (110). In this example, if the location of the mobile device (105) is deemed to be within 5 meters of the ATM (110), the transaction server (100) authorizes an ATM transaction to be performed. One or more other credentials may also be used in authorizing the transaction, in accordance with various embodiments of the invention.

Verification of the location of the mobile device (105) may be performed as an added precaution (aside from or in conjunction with establishing the direct short range wireless connection), in order to prevent a spoofing attack involving an unauthorized mobile device (105). Alternatively, in one or more embodiments of the invention, the mobile device (105) does not communicate directly with the ATM (110). Instead, the mobile application (145) may submit a request to the transaction server (100) and may be authenticated by the transaction server (100). In this case, the transaction server (100) may submit an approval notifying the local transaction engine (160) that the user is (i) present at a location of the ATM (110) and (ii) intends to perform a transaction with the ATM (110). The local transaction engine (160) may then request additional input (e.g., a PIN, selection of a transaction type, etc.) from the user and/or proceed to perform the requested transaction (e.g., withdrawal of a cash amount).

In one or more embodiments of the invention, the local transaction engine (160) obtains additional authentication data from the user, such as a personal identification number (PIN) and/or a biometric scan in order to establish the direct short range wireless connection and/or to perform a transaction with the ATM (110).

In one or more embodiments of the invention, the local transaction engine (160) includes functionality to receive the identifier of the user from the mobile application (145) over the direct short range wireless connection. The mobile application (145) may also send financial data (e.g., a requested ATM transaction type or amount, etc.) to the local transaction engine (160) over the connection. The local transaction engine (160) may receive any other information required for authentication and/or identification of the user, financial account(s) (e.g., financial account (120)), and/or mobile device (105), in accordance with various embodiments of the invention.

In one or more embodiments of the invention, the local transaction engine (160) includes functionality to prompt the user for an authentication credential after establishing the direct short range wireless connection. The ATM (110) may then receive entry of the authentication credential from the user. In one or more embodiments of the invention, the local transaction engine (160) includes functionality to authenticate the mobile application (145), mobile device (105), and/or user based at least on the authentication credential. The local transaction engine (160) may also use other data and/or other criteria for authentication, in accordance with various embodiments of the invention.

In one or more embodiments of the invention, the ATM (110) includes functionality to receive a request from the user to withdraw a cash amount from the financial account. The request may include a transaction type (e.g., deposit, withdrawal, balance inquiry, etc.), an amount, selection of a financial account, and/or any other data required for completing a transaction with the ATM (110). After authentication of the user, the ATM (110) may be configured to perform any type of financial transaction, in accordance with various embodiments of the invention. Any of the aforementioned user inputs may be obtained by the mobile device (105), the ATM (110), and/or any combination of thereof, in accordance with one or more embodiments of the invention. Thus, in one example, the user selects a withdrawal transaction type using a user interface of the ATM (110). In another example, a user selects a deposit transaction type and enters a deposit amount using a user interface of the mobile device (105).

In one or more embodiments of the invention, the ATM (110) includes functionality to dispense the cash amount to the user. The ATM (110) may also include functionality to obtain cash or check deposits, display an account balance or other financial information, and/or to perform any other automated banking functions, in accordance with various embodiments of the invention.

In one or more embodiments of the invention, the local transaction engine (160) includes functionality to close the direct short range wireless connection and/or cancel any pending transactions upon detecting the mobile device (105) is no longer within a predefined range of the ATM (110). Thus, for example, if the user walks away from the ATM (110) after initiating a transaction, the local transaction engine (160) may end the current session, notify the user (e.g., by sending a text message or application message to the mobile device (105)), and/or alert the financial institution (115) of potential fraud. Upon receiving a notification of potential fraud, the financial institution (115) may freeze the financial account (120) and/or call the mobile device (105) with an automated message notifying the user of the potential fraud.

In one or more embodiments of the invention, the local transaction engine (160) includes functionality to determine that the user is facing the ATM (110). The ATM (110) may include a camera (not shown) and a facial recognition module (not shown) configured to capture an image or video of the user. The facial recognition module may determine based on the image/video, that the user is oriented towards the ATM (110) and/or that the user is within proximity of the ATM (110).

In one or more embodiments of the invention, the mobile device (105) includes a gyroscope (not shown) configured to detect an orientation of the user. The mobile application (145) determine, based on the orientation of the user, that the user is facing the ATM (110) and may notify the transaction engine (100) and/or the local transaction engine (160) that the user is facing the ATM (110). In one or more embodiments of the invention, the local transaction engine (160) includes functionality to request a confirmation of the user's orientation from the mobile device (105) before proceeding with an ATM transaction.

In one or more embodiments of the invention, the financial institution (115) is an entity holding and/or servicing the financial account (120). Examples of a financial institution may include, but are not limited to, a personal bank, a credit card company, a credit union, an investment bank, a payment intermediary service, a business or personal creditor, and/or any other entity associated with the financial account (120). References to the financial institution (115), as used herein, may also refer to a software application or a series of related software applications of the financial institution (115) (whether located remotely or at a location of the financial institution (115)).

Figure 1C:
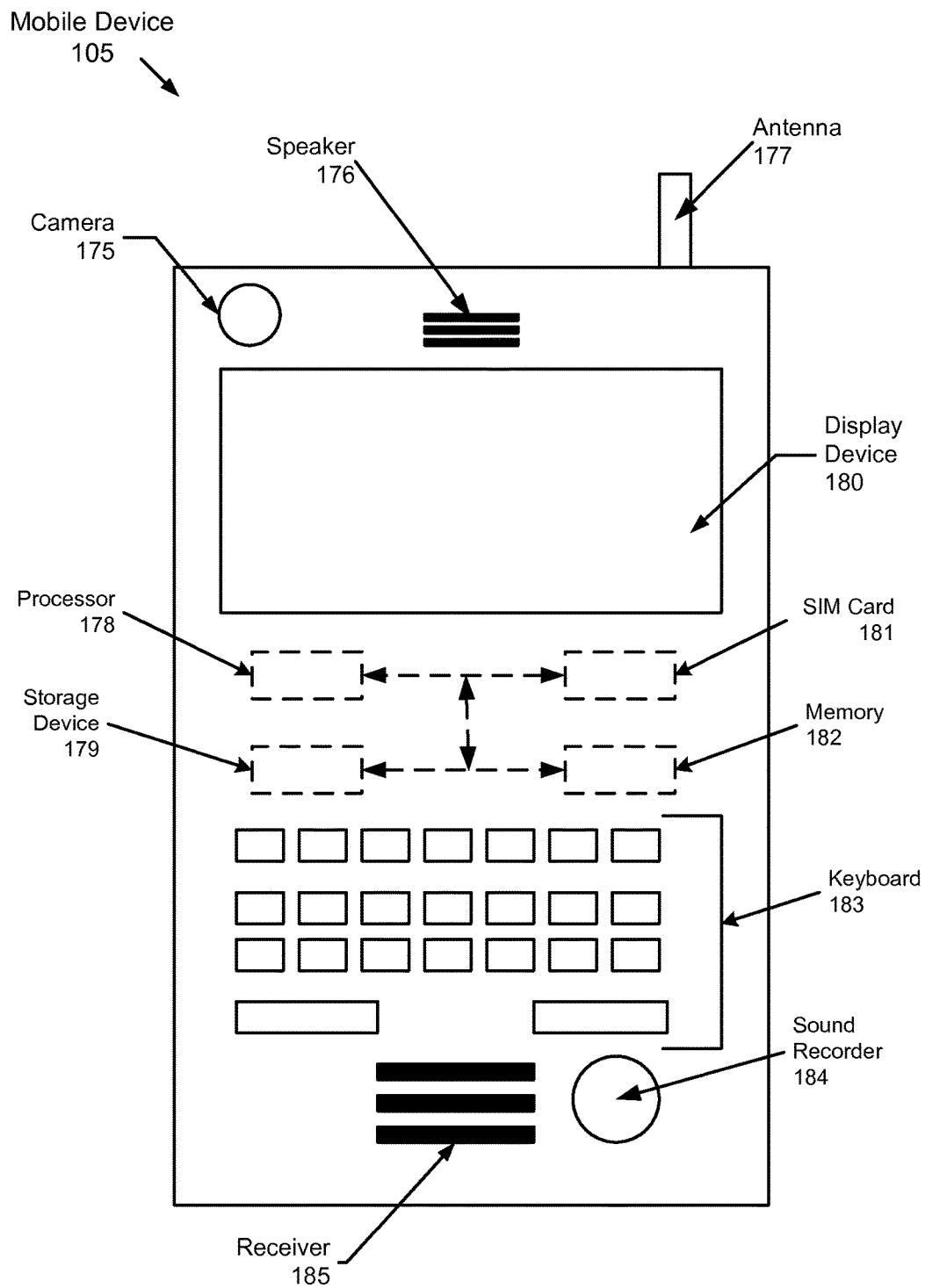
FIG. 1C shows a mobile device in accordance with one or more embodiments of the invention.

Embodiments of the invention may be implemented on virtually any type of mobile device regardless of the platform being used. In one or more embodiments of the invention, the mobile device (105) includes any portable device that provides a user interface. Examples of mobile devices may include, but are not limited to, cellular phones, personal digital assistants, netbooks, tablet computers, personal communicators, pagers, smart phones, or any other computing device. For example, as shown in FIG. 1C, a mobile device (105) includes a processor (178), memory (182), a storage device (179), a subscriber identity module (SIM) card (181), a speaker (176), a receiver (185), a keyboard (183), a sound recorder (184), a display device (180), a camera (175), and an antenna (177).

The mobile device (105) includes one or more processor(s) (178), associated memory (182) (e.g., RAM, cache memory, flash memory, etc.), a storage device (179) (e.g., a hard disk, an optical drive such as a compact disk drive or digital video disk (DVD) drive, a flash memory stick, etc.), a SIM card (181), and numerous other elements and functionalities typical of today's mobile devices (not shown). The mobile device (105) may include input means and output means, such as the keyboard (183), the receiver (185), and/or the display device (e.g., a liquid crystal display screen) (180), which permits a user to enter and/or display keystrokes including numeric, alphabetic, and other characters, images, or other media types. Other input devices may include a camera (175), a sound recorder (184), and/or other data recording mechanism. Those skilled in the art will appreciate that these input and output means may take other forms now known or later developed. Using embodiments of the present invention, a consumer may initiate an electronic funds transfer using the mobile device (105).

The mobile device (105) may be connected to a network (e.g., a local area network (LAN), a wide area network (WAN) such as the Internet, or any other similar type of network) via the antenna (177) or other network interface connection(s) (not shown). In one or more embodiments of the invention, the network connection may be facilitated by a wireless infrastructure (not shown), including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc. In one or more embodiments of the invention, the wireless infrastructure may associate any message received from a mobile device (105) with a mobile device identifier of the mobile device (105).

In one or more embodiments of the invention, the network connection may be facilitated by a hardwired or other similar connection. For example, the network connection may involve a hardwire connection or short-range wireless connectivity technology with a second mobile device, a printing mechanism, a scanner, or a recording system.

Figure 2:
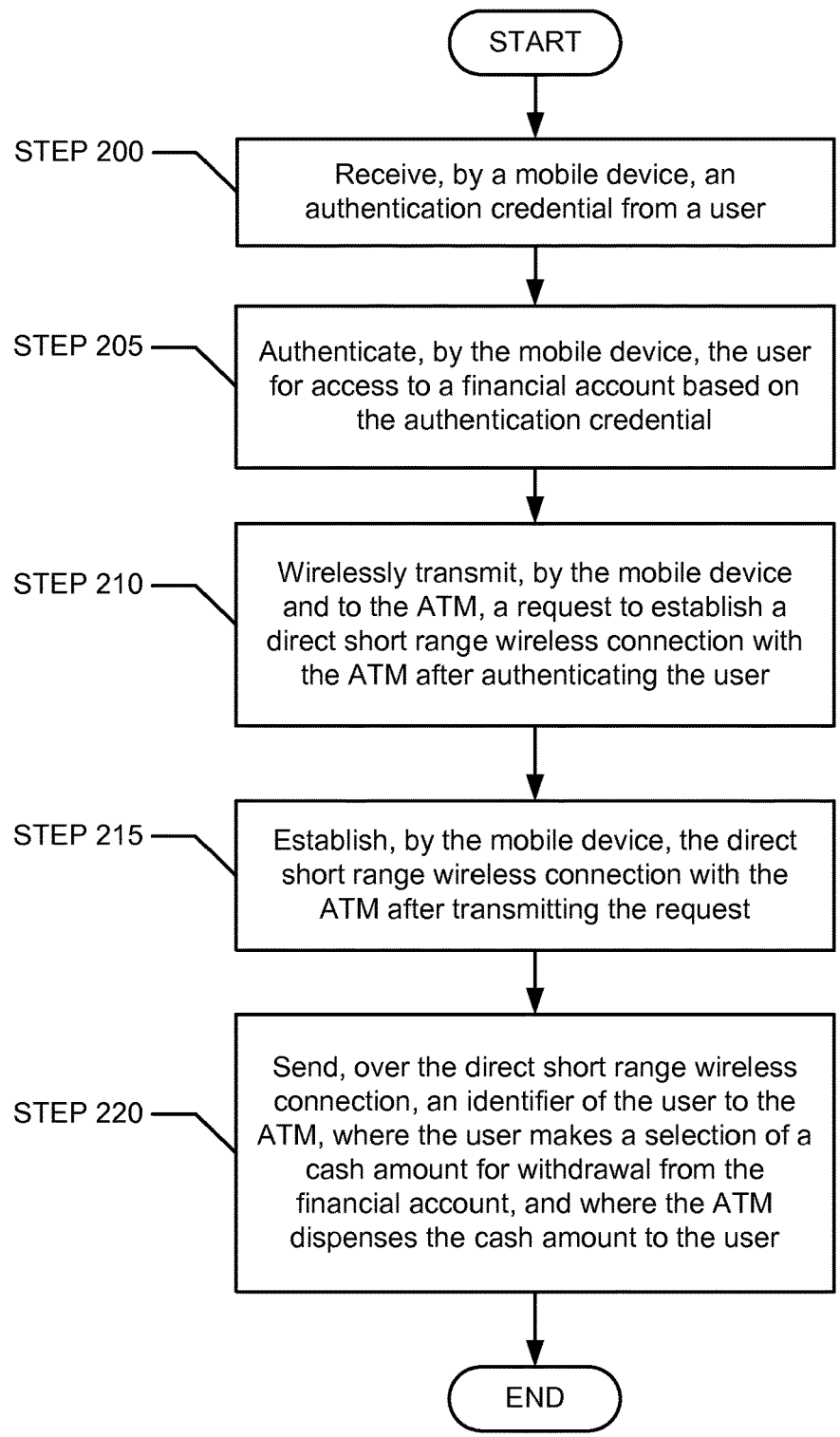
FIGS. 2 and 3 show flowcharts in accordance with one or more embodiments of the invention.

FIG. 2 shows a flowchart of a method for conducting a transaction with an automated teller machine. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 2 should not be construed as limiting the scope of the invention.

In STEP 200, in one or more embodiments of the invention, an authentication credential is received from a user of a mobile device. The authentication credential may be received by the mobile device upon a user's arrival at a location of an ATM. The authentication credential may be entered in order to access a mobile financial application executing on the mobile device and may be pre-established by the user during one or more prior sessions with the mobile financial application.

In STEP 205, in one or more embodiments of the invention, the user is authenticated, by the mobile device, for access to a financial account based on the authentication credential. Authenticating the user may involve sending the one or more authentication credentials to a transaction server (e.g., transaction server (100) of FIGS. 1A and 1B, discussed above). In one or more embodiments of the invention, the user is authenticated by the transaction server and an authentication message is sent to the mobile device and/or the ATM.

In STEP 210, in one or more embodiments of the invention, a request to establish a direct short range wireless connection with the ATM is wirelessly transmitted from the mobile device to the ATM after authenticating the user. In one or more embodiments of the invention, the ATM may detect that the mobile device is within range, and may invite the mobile device to establish the direct short range wireless connection.

In STEP 215, in one or more embodiments of the invention, the direct short range wireless connection is established with the ATM after transmitting the request. The ATM may be configured to listen for incoming requests and to establish the direct short range wireless connection in response to the request.

In STEP 220, in one or more embodiments of the invention, an identifier of the user is sent to the ATM over the direct short range wireless connection. The user then makes a selection of a cash amount for withdrawal from the financial account, and the ATM dispenses the cash amount to the user. The selection of the cash amount may be made using the mobile device or the ATM, in accordance with various embodiments of the invention. Upon dispensing the cash amount, the ATM may close the direct short range wireless connection or prompt the user for instructions on how to proceed (e.g., perform another transaction or exit).

Figure 3:
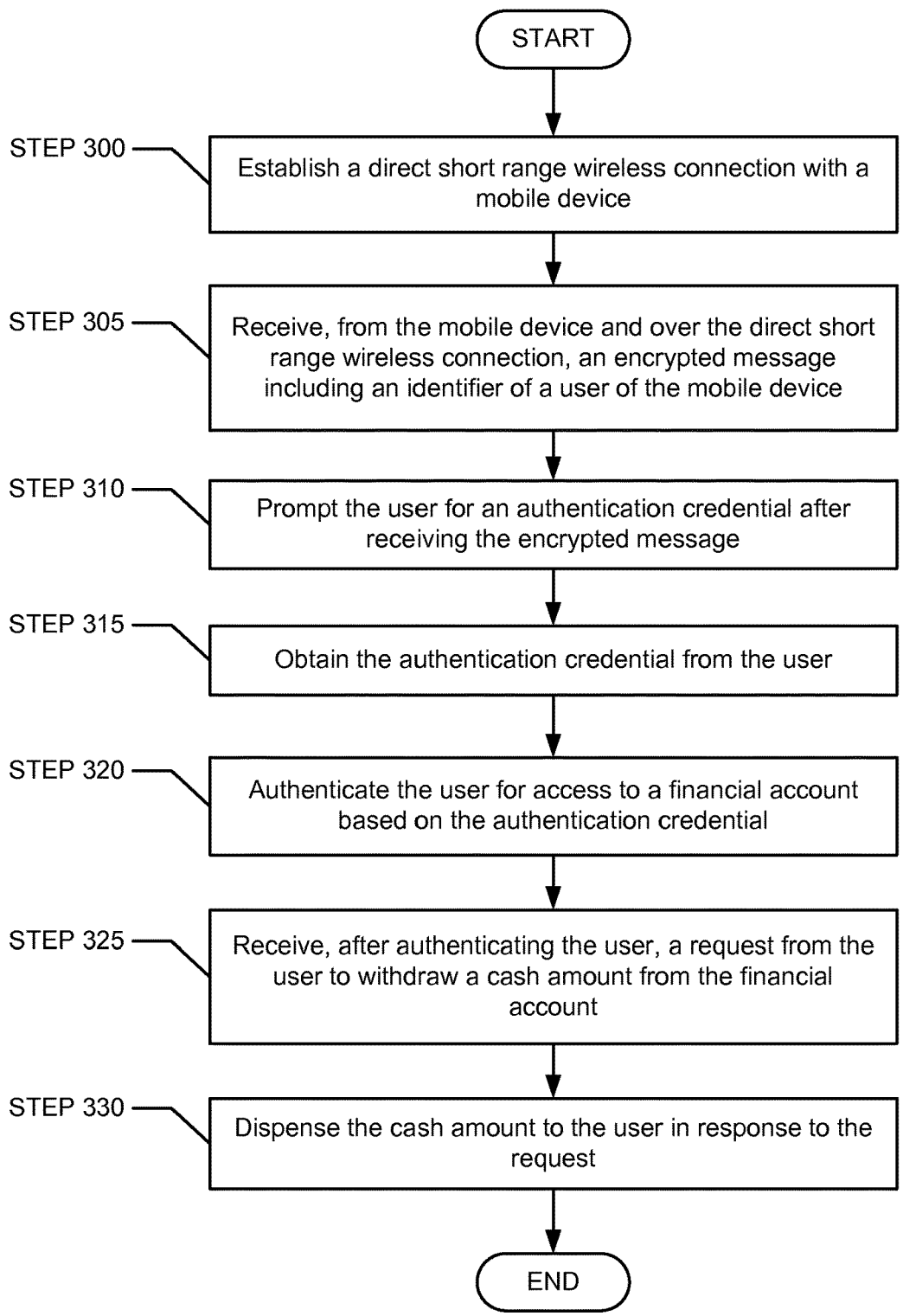

FIG. 3 shows a flowchart of a method for conducting a transaction with an automated teller machine. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 3 should not be construed as limiting the scope of the invention.

In STEP 300, in one or more embodiments of the invention, a direct short range wireless connection is established between a mobile device and an ATM. The direct short range wireless connection may be initiated by either the ATM or the mobile device and may utilize any wireless short range protocol, in accordance with various embodiments of the invention.

In STEP 305, in one or more embodiments of the invention, an encrypted message including an identifier of a user of the mobile device is received from the mobile device over the direct short range wireless connection. The identifier of the user may, after authenticating the user, be used to uniquely identify a user account and to fetch financial account data of the user by the ATM.

In STEP 310, in one or more embodiments of the invention, the user is prompted for an authentication credential after receiving the encrypted message. The authentication credential may be used to confirm that the user is facing the ATM and is prepared to perform an ATM transaction, in accordance with various embodiments of the invention. For example, the ATM may require that the user enter a PIN in order to proceed with a requested withdrawal.

In STEP 315, in one or more embodiments of the invention, the authentication credential is received from the user. The user may enter the authentication credential into the ATM or the mobile device, in accordance with various embodiments of the invention.

In STEP 320, in one or more embodiments of the invention, the user is authenticated for access to a financial account based on the authentication credential. Authenticating the user may involve identifying an account of the user by a remote transaction engine. One or more financial accounts of the user which are linked to the user account may be authenticated for access by the user account. Thus, authenticating the user for access to a financial account may involve authenticating the user account, where all of the linked financial accounts are authenticated by virtue of the user account.

In STEP 325, in one or more embodiments of the invention, a request to withdraw a cash amount from the financial account is received from the user. The request may be entered into either the ATM or the mobile device in response to displaying a user interface to the user. In one or more embodiments of the invention, the user interface displays one or more transaction types to the user for selection. The user may request the cash withdrawal by selecting a withdrawal transaction type from the user interface.

In STEP 330, in one or more embodiments of the invention, the cash amount is dispensed from the ATM to the user in response to the request. The ATM may automatically end the session after dispensing the cash or may prompt the user for instructions to continue. For example, the ATM may ask the user if the user intends to perform another ATM transaction and/or may display one or more available transaction types to the user for selection. Any number of different ATM options may be displayed to the user (either on the mobile device, the ATM, or both), in accordance with various embodiments of the invention.

The following section describes various examples of the invention. The examples are included to aid in the understanding of the invention but are not intended to limit the scope of the invention.

FIGS. 4A-4D depict example screen shots of a mobile device (400) in accordance with one or more embodiments of the invention. In this example, a user requests to import financial account information into a mobile financial management application (FMA). Initially, during a first session of the mobile FMA, the user swipes a debit card linked to a personal checking account of the user using a card reader attached to the mobile device. The card reader reads the financial account information from the financial card and the mobile FMA sends a request to the bank holding the checking account to import financial data from the checking account. The request includes a name and address of the user, which is then used by a server application of the financial institution to confirm that the user is indeed the owner of the checking account. After confirming the user's identity, the server application sends transaction details and a balance of the checking account to the mobile FMA.

Figure 4A:
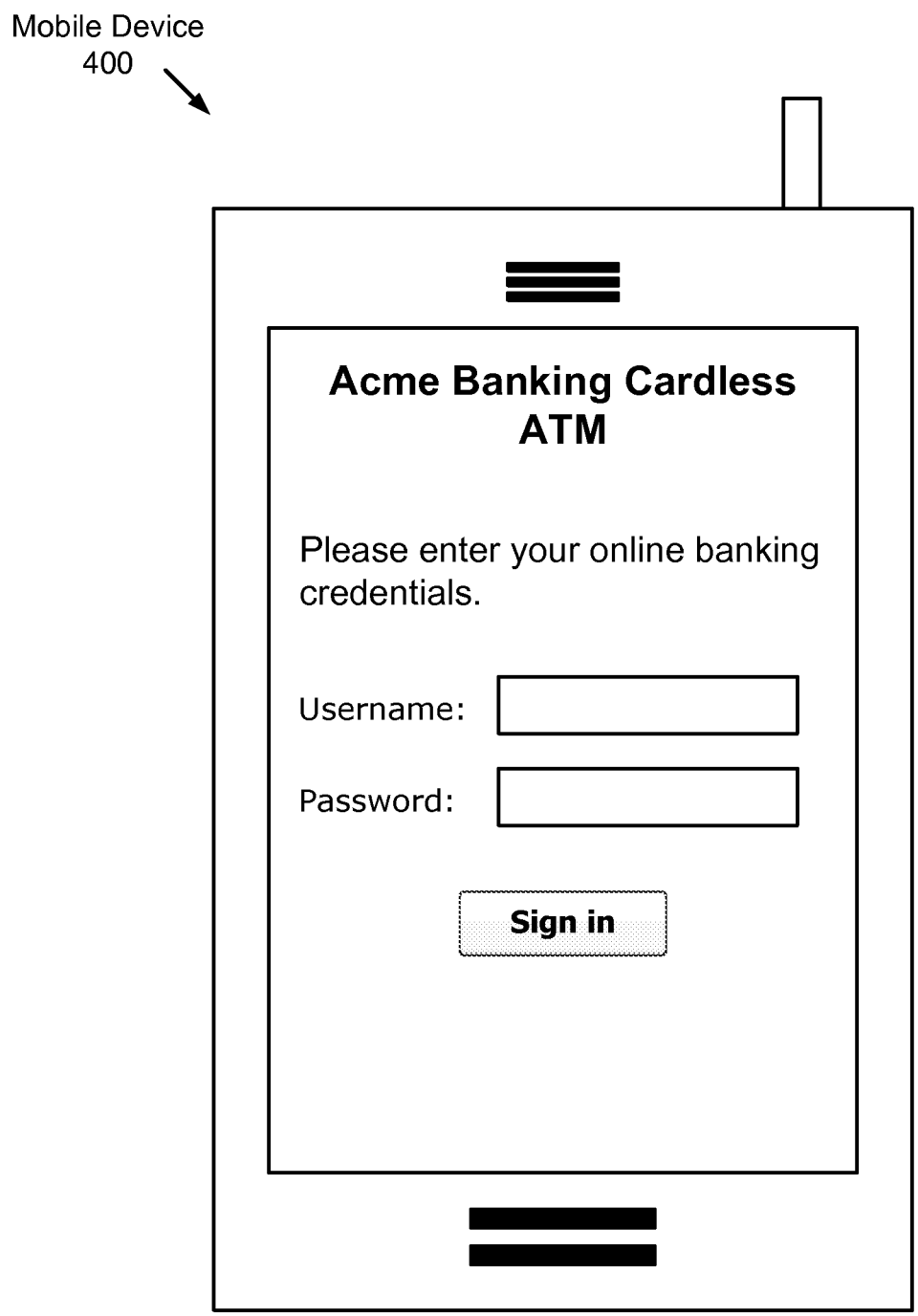
FIGS. 4A-4D show example screenshots of a mobile device in accordance with one or more embodiments of the invention.

Continuing the example, the user stores the financial card in a safe location at the user's home. At a later date, the user intends to withdraw money from the checking account using an ATM. The user drives to the ATM with the mobile device and without the financial card. Upon reaching the ATM, the user stands in a line formed by people waiting to use the ATM. Once in line, the user initiates a second session with the mobile FMA by launching the mobile FMA and providing a user name and password login credentials. FIG. 4A depicts an example screenshot of the mobile FMA requesting the aforementioned login credentials. The mobile FMA sends the credentials to an external transaction engine which sends an approval notification to the mobile FMA indicating the user is authorized to access the user account.

Continuing the example, a user interface of the mobile FMA prompts the user to indicate if the user is (1) not yet arrived at a location of the ATM, (2) waiting in line for the ATM, or (3) facing the ATM and ready to perform a transaction. The user selects the option indicating that they are waiting in line at the location of the ATM. Upon receiving this selection, the mobile FMA confirms that the user is at the location of the ATM by sending a set of GPS coordinates of the mobile device to an external transaction engine. The transaction engine compares the GPS coordinates to the ATM location and determines that they are within a 20 meter radius, as defined by an administrator of the transaction engine.

Figure 4B:
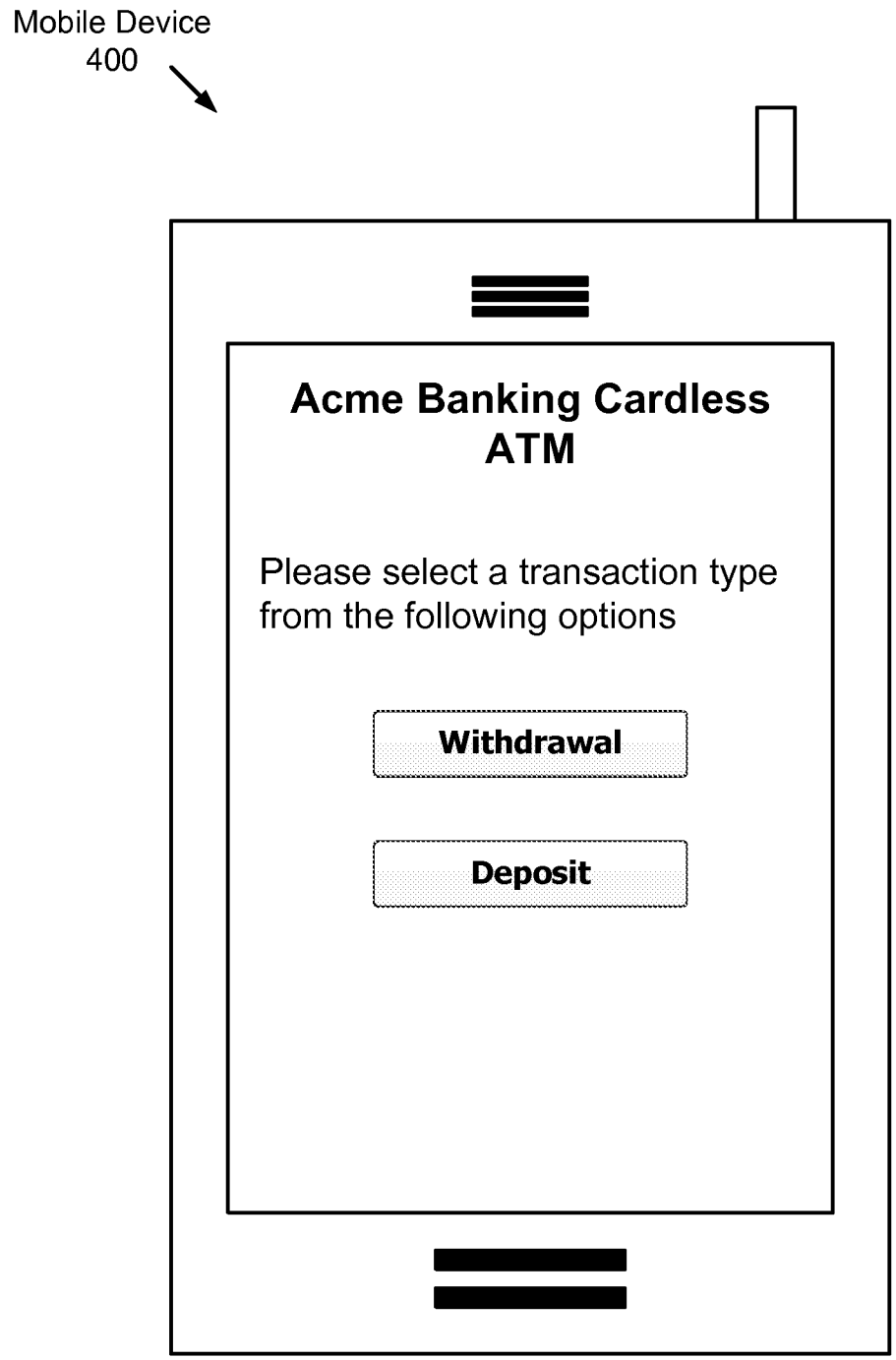
Figure 4C:
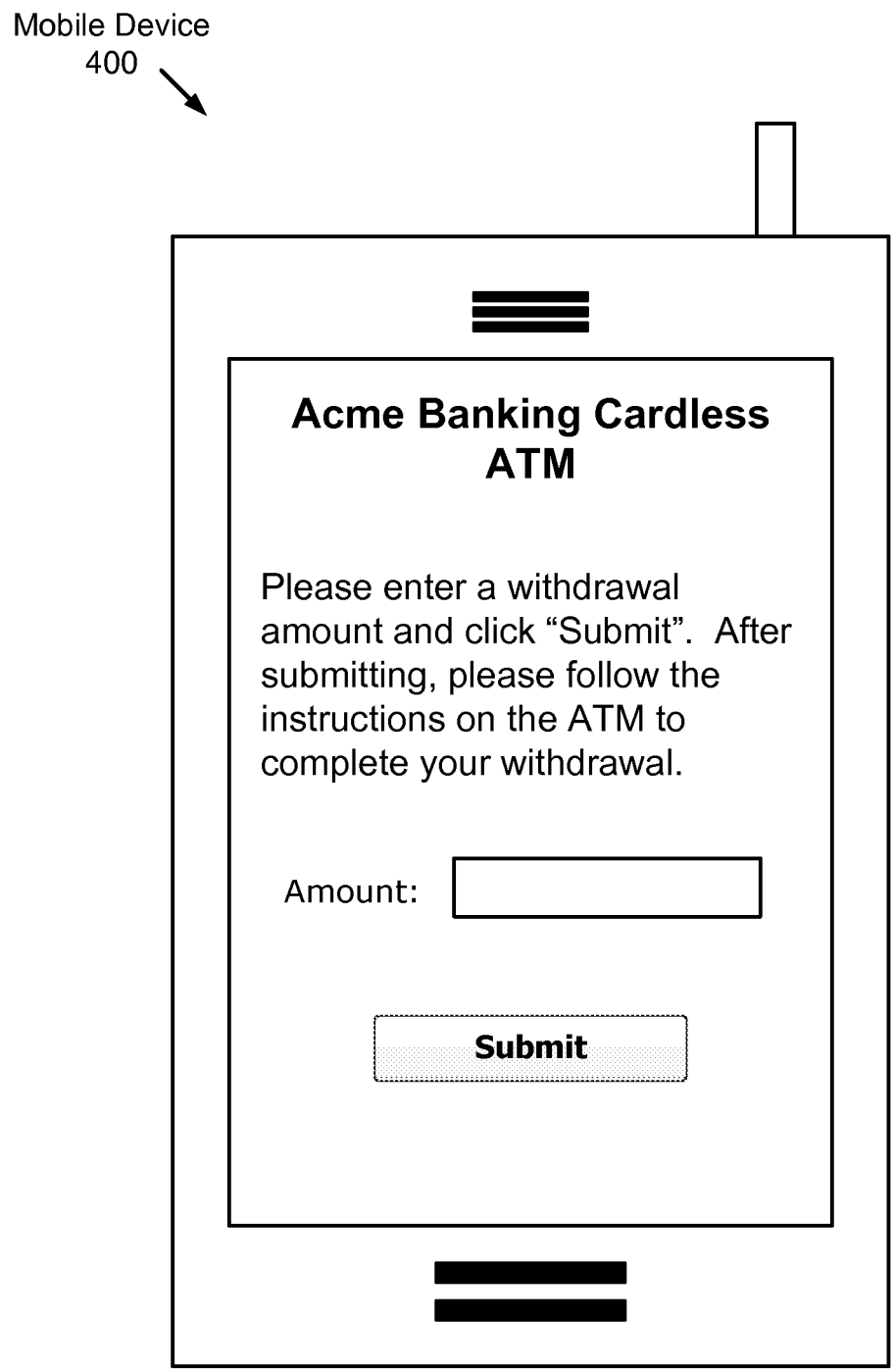

Continuing the example, while the user is waiting in line, the mobile device then prompts the user to select either (1) a withdrawal transaction type or (2) a deposit transaction type. FIG. 4B depicts an example screenshot of the mobile FMA showing a user interface requesting selection of a transaction types. The user makes a selection of the withdrawal transaction type and is prompted to select a withdrawal amount. FIG. 4C depicts an example screenshot of the mobile FMA showing a user interface requesting input of a withdrawal amount. After entering the requested cash withdrawal amount, the user waits another 5 minutes before reaching the front of the line.

Figure 4D:
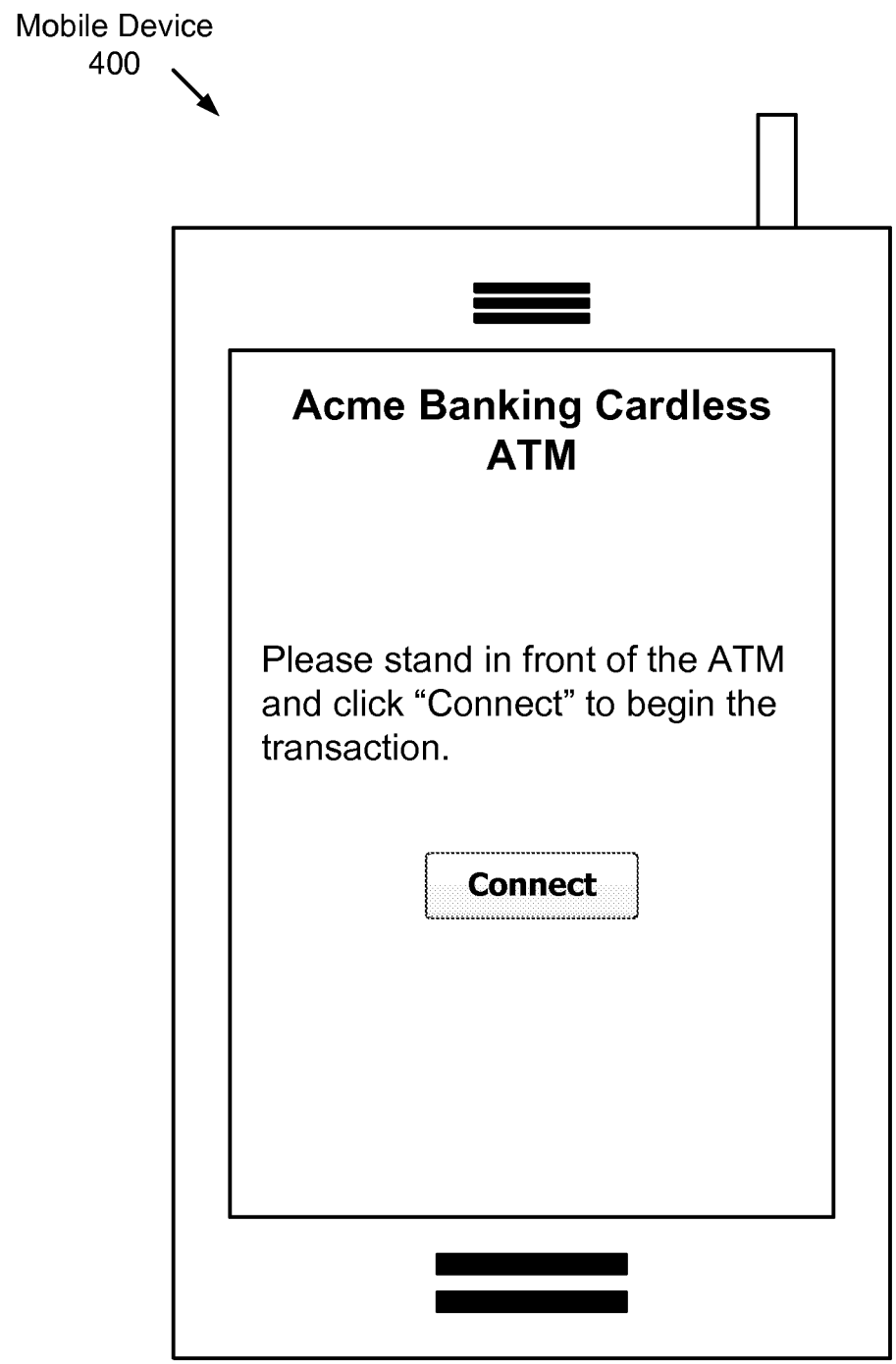

Continuing the example, the user then approaches the ATM to complete the transaction. The mobile FMA detects that a near field communication (NFC) enabled computing device (i.e., the ATM) is within range. Upon detecting that the ATM is within NFC range, the mobile FMA obtains orientation data from a gyroscope of the mobile device. Based on the orientation data the mobile FMA determines that the user is facing the ATM. After confirming that the user is facing the ATM, the mobile FMA prompts the user to confirm that they are standing in front of the ATM and prepared to begin the withdrawal transaction. FIG. 4D depicts an example screenshot of the mobile FMA prompting the user to begin the transaction. Upon receiving the confirmation, the mobile FMA sends a request to the ATM to establish a near field communication (NFC) connection with the ATM. An encrypted NFC connection is then established between the ATM and the mobile device.

Continuing the example, mobile device sends, over the NFC connection, encrypted authorization tokens identifying the user's checking account and a previously entered PIN of the user to the ATM. At this point the ATM requests that the user enter the PIN into a display screen of the ATM in order to validate that the user is present and ready to complete the withdrawal. After receiving the PIN and authorizing the user based on the PIN, the ATM dispenses the requested cash amount to the user.

Figure 5:
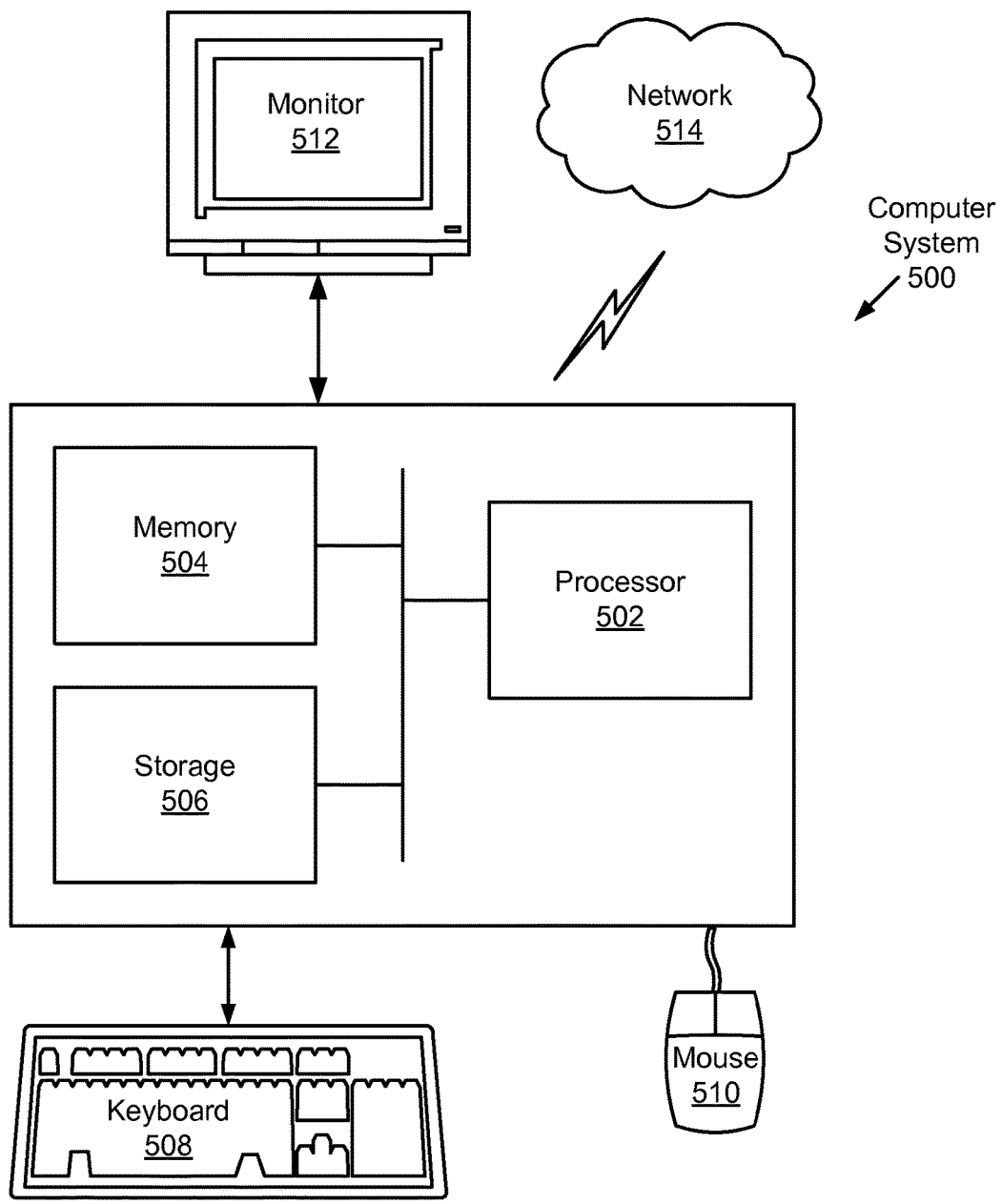
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processor(s) (502) (such as a central processing unit (CPU), integrated circuit, hardware processor, etc.), associated memory (504) (e.g., RAM, cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention (e.g., transaction server (100), etc. of FIGS. 1A and 1B, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By performing one or more ATM transactions without the use of a financial card, it may be possible to reduce the occurrence of financial fraud due to lost or stolen cards. Additionally, it may be possible to reduce the amount of unsecured sensitive data carried by the user.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for conducting financial transactions with an automated teller machine (ATM), using a mobile device, the method comprising:
    receiving, by the mobile device, a first authentication credential from a user;
    authenticating the user, by the mobile device, for access to a mobile application associated with a financial account, based on the first authentication credential;
    identifying, by the mobile device and using a GPS receiver of the mobile device, a location coordinate of the mobile device;
    sending, by the mobile device, the location coordinate of the mobile device to a transaction server;
    receiving, by the mobile device, a verification from the transaction server that the mobile device is within a predefined proximity of the ATM;
    obtaining, by the mobile device, orientation data from a gyroscope of the mobile device;
    confirming, by the mobile device and based on the orientation data, that the user is facing the ATM, by displaying a prompt to the user;
    after confirming, by the mobile device, that the user is facing the ATM, prompting the user, by the mobile device, to confirm that the user is located in front of the ATM and is prepared to begin a withdrawal transaction;
    receiving, by the mobile device, user confirmation that the user is located in front of the ATM and is prepared to begin the withdrawal transaction;
    based on the received confirmation, wirelessly transmitting, by the mobile device over a cellular data network and to the transaction server, a first request to establish a direct short range wireless connection with the ATM;
    after transmitting the first request, receiving, by the mobile device and from the ATM, an authorization of the user; and
    establishing, by the mobile device, the direct short range wireless connection with the ATM, based on the authorization.

2. The method of claim 1, further comprising:
    receiving, by the ATM, a second authentication credential from the user;
    authenticating, by the ATM, the user for access to the financial account, based on the second authentication credential;
    displaying, after authenticating the user, and by the ATM, an identifier of the financial account to the user; and
    receiving, by the ATM and from the user, a selection of cash amount for withdrawal from the financial account, prior to dispensing the cash amount.

3. The method of claim 1, wherein the first authentication credential is one selected from a group consisting of a personal identification number (PIN), a password, a biometric scan, an answer to a challenge question, and a selection of a secret image.

4. The method of claim 1, wherein the direct short range wireless connection is one selected from a group consisting of a near field communication connection, a Bluetooth connection, an IrDA connection, a Wireless USB connection, a Z-Wave connection, a ZigBee connection, and a Body Area Network connection.

5. The method of claim 2, further comprising:
sending, by the mobile device, a request to import a record of the cash amount to a financial management application (FMA);
importing, by the FMA, the record of the cash amount from a financial management account of the user; and
updating, by the FMA, a balance of the financial account based on the record of the cash amount.

6. The method of claim 1, further comprising:
prior to receiving the first authentication credential:
obtaining, by a card reader operatively attached to the mobile device, a scan of a financial card associated with the financial account; and
registering, based on the scan, the user of the mobile device with the mobile application,
wherein the direct short range wireless connection is established with the ATM based on the registration.

7. A mobile device associated with a user, comprising:
a display;
a GPS receiver;
a gyroscope;
a processor; and
a non-transitory computer-readable storage medium comprising a mobile application and a plurality of instructions for conducting transactions with an automated teller machine (ATM), the plurality of instructions, when executed by the processor, cause the processor to perform the steps of:
receiving, a first authentication credential from the user;
authenticating, based on the first authentication credential, the user for accessing the mobile application associated with a financial account;
identifying, using the GPS receiver, a location coordinate associated with the user;
sending the location coordinate to a transaction server;
receiving a verification from the transaction server that the user is within a predefined proximity of the ATM;
obtaining orientation data from the gyroscope;
confirming, based on the orientation data, that the user is facing the ATM by displaying, on the display, a prompt to the user;
after confirming that the user is facing the ATM, prompting the user, via the display, to confirm that the user is located in front of the ATM and is prepared to begin a withdrawal transaction;
receiving user confirmation, that the user is located in front of the ATM and is prepared to begin the withdrawal transaction;
based on the received confirmation, wirelessly transmitting, over a cellular data network and to the transaction server, a first request to establish a direct short range wireless connection with the ATM;
receiving, from the ATM, an authorization of the user; and
establishing the direct short range wireless connection with the ATM, based on the authorization.

8. The mobile device of claim 7, wherein the authentication credential is one selected from a group consisting of a personal identification number (PIN), a password, a biometric scan, an answer to a challenge question, and a selection of a secret image.

9. The mobile device of claim 7, wherein the direct short range wireless connection is one selected from a group consisting of a near field communication connection, a Bluetooth connection, an IrDA connection, a Wireless USB connection, a Z-Wave connection, a ZigBee connection, and a Body Area Network connection.

10. The mobile device of claim 7, wherein the plurality of instructions further cause the processor to perform the step of:
sending, to the transaction server, a request to import a record of the cash amount to a financial management application (FMA).

11. The mobile device of claim 7, further comprising:
a card reader,
wherein the plurality of instructions further cause the processor to perform the steps of:
prior to receiving the authentication credential:
obtaining, from the card reader, a scan of a financial card associated with the financial account; and
registering, based on the scan, the user with the mobile application,
wherein the direct short range wireless connection is established with the ATM based on the registration.

* * * * *